United States Patent

[11] 3,536,077

[72] Inventors Ted Stott and Lyman J. Gunyou,
 Celina; Robert A. Stelzer,
 Coldwater, Ohio
[21] Appl. No. 716,590
[22] Filed March 27, 1968
[45] Patented Oct. 27, 1970
[73] Assignee Avco Corporation
 Coldwater, Ohio
 a corporation of Delaware

[54] CORN SHELLERS
 10 Claims, 4 Drawing Figs.
[52] U.S. Cl. .................................................. 130/6
[51] Int. Cl. ............................................... A01f 11/06
[50] Field of Search ..................................... 130/6

[56] References Cited
 UNITED STATES PATENTS
 353,885 12/1886 Roberts ..................... 130/6
 2,687,734 8/1954 Jones ......................... 130/6

*Primary Examiner*—A. F. Guida
*Attorney*—Charles M. Hogan and Gary M. Gron

ABSTRACT: The disclosure illustrates a corn sheller of the type in which a cylinder having teeth thereon is rotatable in a perforated cage to remove kernels from ears of corn which have been fed into the cage. The sheller is tilted from the horizontal so that the outlet end is higher than the inlet end, thereby retarding the movement of ears of corn to the discharge end. A plurality of longitudinal rasp bars are positioned in the sheller to aid in the removal of the kernels. A pair of semicircular doors are provided at the discharge end to variably restrict the outer periphery of the cage to further retard the movement of the kernels of corn through the cage.

Patented Oct. 27, 1970 3,536,077

INVENTORS.
TED STOTT
LYMAN J. GUNYOU
BY ROBERT A. STELZER

ATTORNEYS

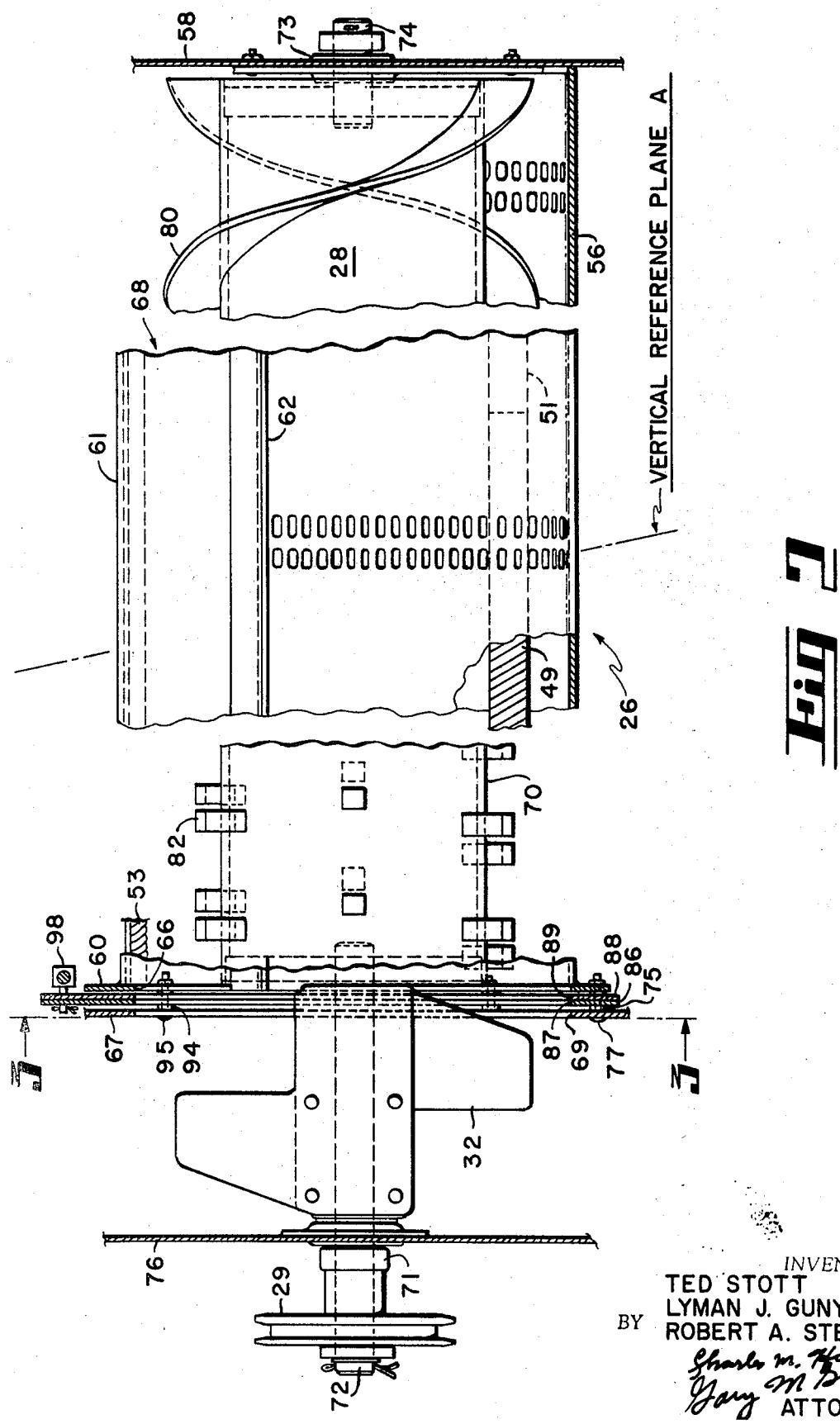

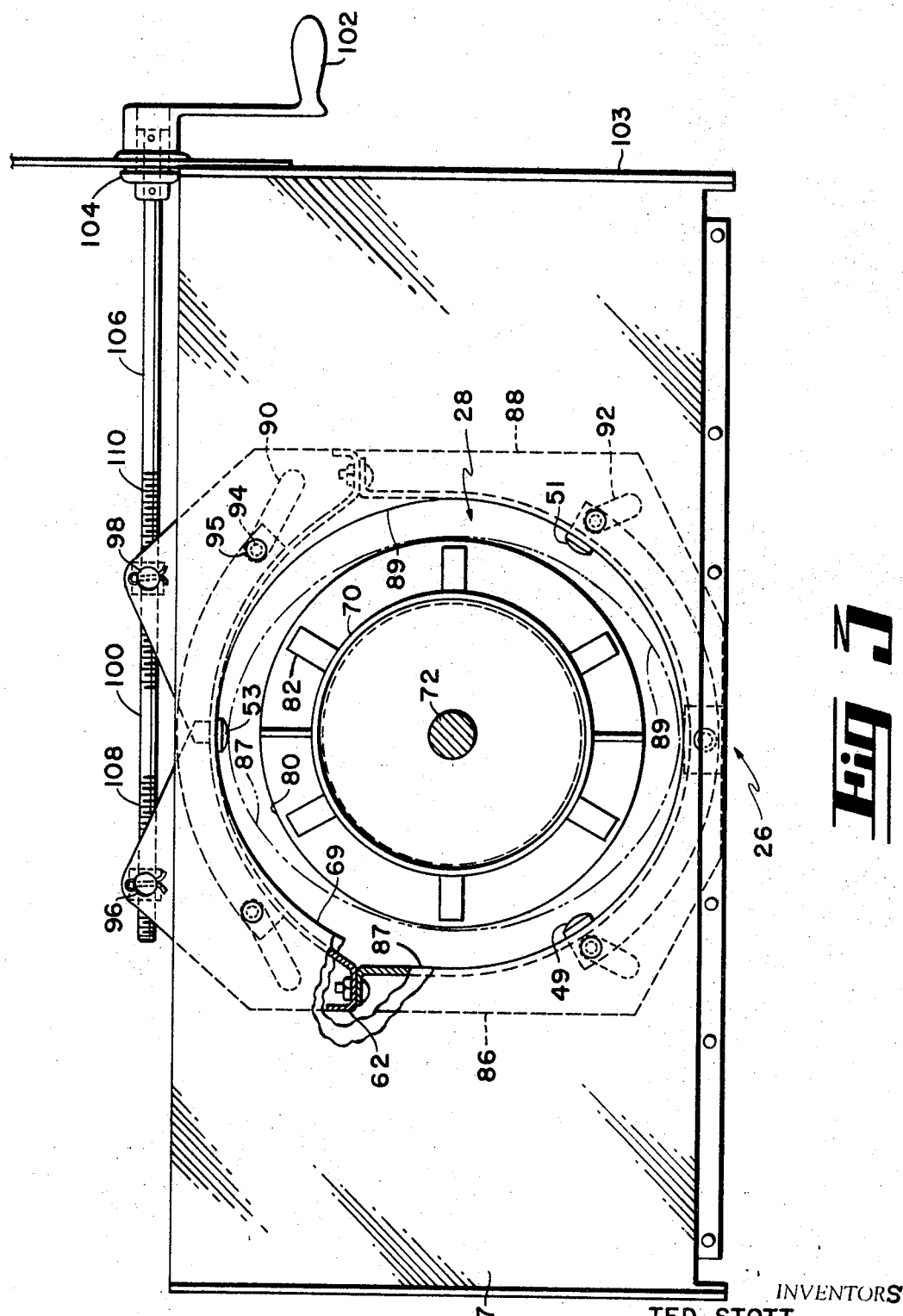

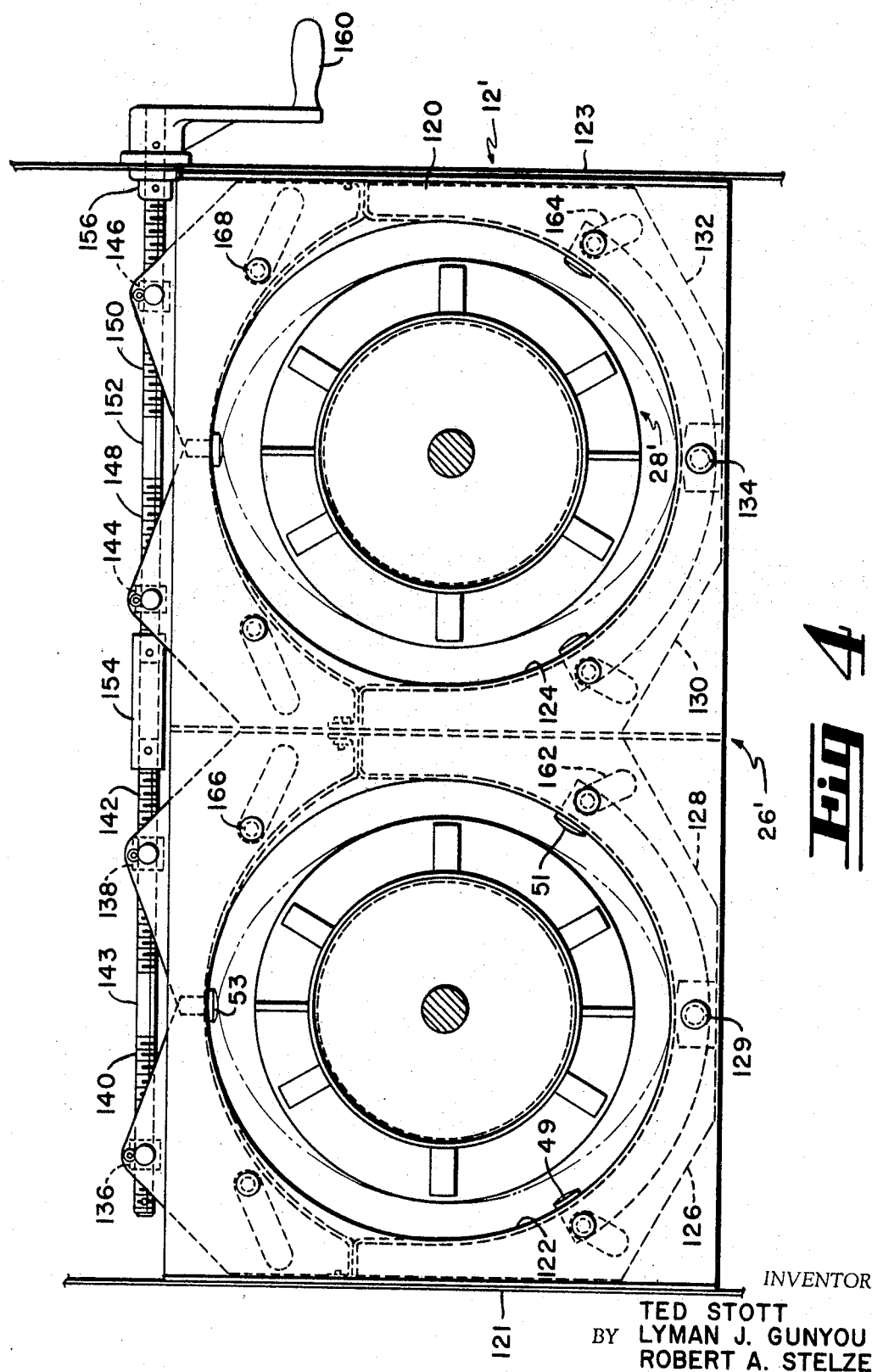

CORN SHELLERS

The present invention relates to agricultural processing machinery and more particularly to corn shelling apparatus.

It is a well-known expedient to separate kernels of corn from corn ears by feeding the unshelled ears of corn through a stationary cage having a rotating cylinder in its interior with teeth projecting therefrom. The ears of corn which pass through the cage are rubbed against each other and the perforated cage by the teeth on the cylinder, thereby knocking off the individual kernels of corn which pass through the perforations into a suitable collecting chamber. With such an arrangement it is frequently necessary to increase the pressure on the ears of corn by the sheller cylinder and the cage to insure complete shelling of the ears. This has been done in the past by providing a relatively substantial blockage of the discharge end of the cage so that ears of corn are packed into the cylinder.

While this approach is generally effective in increasing the effectiveness of shelling, it has the disadvantage of requiring a substantial torque input to the cylinder to rub the ears of corn against the cage. This substantial power requirement is generally reflected in higher operating costs and reduced operating life for the power unit used to drive the corn sheller.

A second disadvantage of this approach is that in field operation the restriction must be varied to meet the changing conditions of corn harvesting, e.g., change in moisture content, accumulation of waste material. It is frequently necessary to provide a partial disassembly of a shelling unit to adjust the large restrictions to meet the varying field conditions. With the device referred to above it is frequently necessary to terminate operation of the machine altogether and adjust the restrictions.

Accordingly, it is an object of the present invention to increase the effectiveness with which corn is shelled while at the same time requiring a minimum power requirement to drive the unit which is used to shell the corn.

It is a further object of the present invention to provide a corn sheller unit which is easily adjustable to meet the varying conditions experienced in the field.

The above ends are achieved in the broader aspects of the present invention by providing a corn sheller which comprises a perforated cage having a relatively unobstructed discharge end. A sheller cylinder having a plurality of spikes or lugs arranged in a helix pattern, rotates in the cage to cause ears of corn to be rubbed between the perforated cage and cylinder and advanced to the outlet end so that kernels of corn are separated from the cob of the ear and pass outwardly through the perforations. The sheller cylinder and the cage are tilted from the horizontal so that the action of gravity retards the movement of the ears to the discharge end and increases the separation of kernels from the corn. Arcuate barrier means are also provided for adjustably obstructing the periphery of the discharge end of the cylinder for further retarding the movement of ears from the discharge end and increasing the separation of kernels.

In yet another aspect of the present invention, the above corn sheller is mounted in a housing and the adjustable arcuate barrier means is actuated by a shaft extending to a crank handle positioned on the outside of the housing to facilitate ready adjustment of the restriction.

The above and other related objects and features of the present invention will be apparent from a reading of the description of the disclosure found in the accompanying drawings and the novelty thereof pointed out in the appended claims.

In the drawings:

FIG. 2 is a longitudinal section view of a portion of the corn sheller shown in FIG. 1, particularly illustrating a sheller cylinder and cage of the present invention;

FIG. 3 is a view taken on lines 3–3 of FIG. 2; and

FIG. 4 is an end view of a corn sheller cylinder and cage illustrating an alternate embodiment of the present invention.

Figure 1:
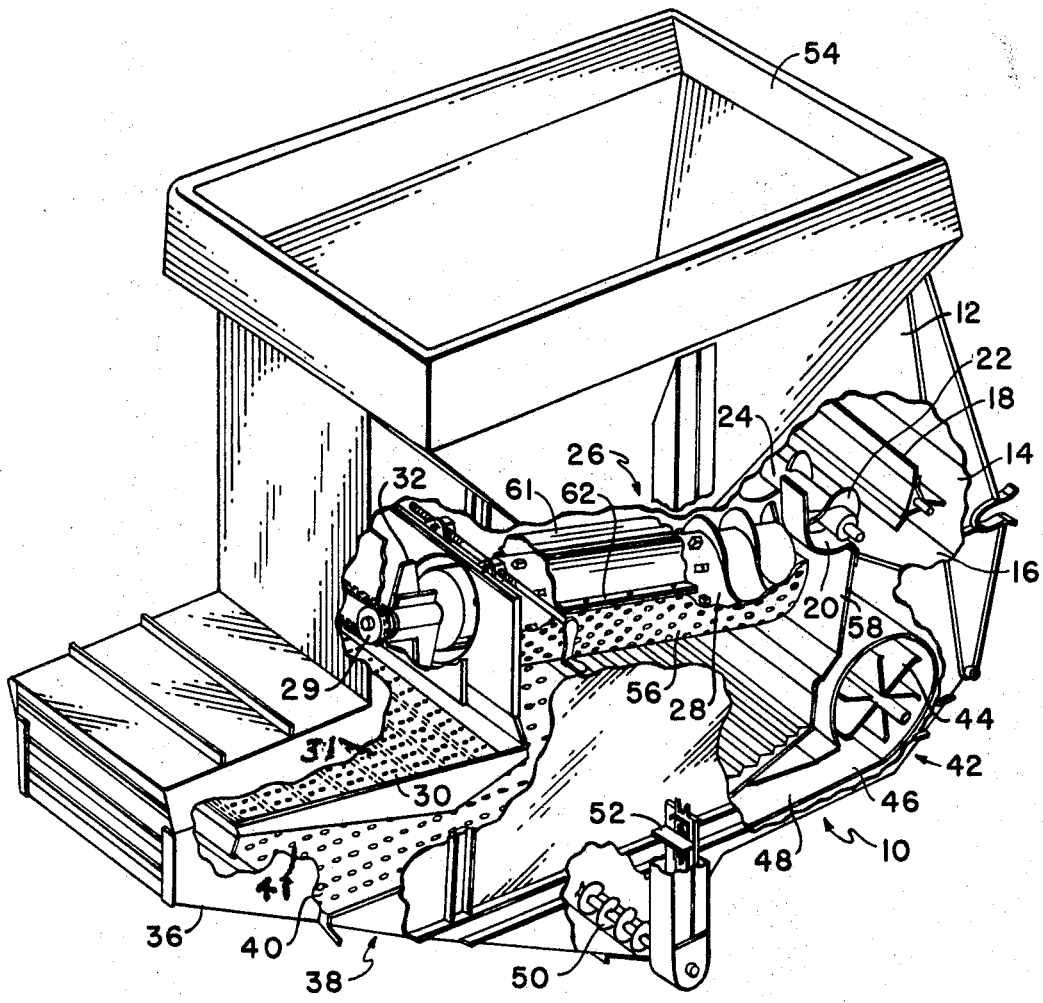
FIG. 1 is a partially cutaway simplified perspective view of a corn sheller embodying the present invention.

Reference is now had to FIG. 1 which illustrates a corn shelling unit generally indicated by reference numeral 10. The shelling unit 10 may be secured to a self-propelled corn harvester.

The corn shelling unit 10 comprises an outer housing 12 which has an inlet 14 for receiving unshelled ears of corn. The unshelled corn is fed into the unit up a ramp 16 by a rotating paddle wheel 18. The ramp 16 terminates in a curved portion 20 which has an auger 22 positioned therein. The paddle wheel 18 and auger 22 are rotated by a suitable drive source (not shown), usually derived from a power unit, to receive unshelled ears of corn and feed the ears of corn up the ramp 16 and to the center of the curved portion to an opening 24. From there the ears drop into a cage sheller assembly 26 where the ears are acted upon by a rotatable cylinder 28 having spikes or lugs thereon to remove the kernels of corn from the corn ears and cause the kernels to pass through perforations in the cage sheller 26. The rotatable cylinder 28 has a double sprocket 29 secured thereto which is rotated by a suitable drive source (not shown), which is usually derived from the same power unit used to drive the auger 22 and the paddle wheel 18.

As later described in detail, cobs, husks and any kernels that have not passed through the perforated cage, pass to the discharge end of the cage sheller 26 where they are distributed upon a conventional reciprocating sheet 30 having perforations 31, by a pair of paddle wheels 32 secured to the rotatable cylinder 28. The sheet 30 may be reciproacted by conventional means. The reciprocating motion of the stepped perforated sheet 30 causes the residue, such as cobs, husks, leaves, etc., to be gradually urged to the rear of the sheet 30. Any remaining kernels of corn are separated out and pass through the perforations. The residue passes to the end of the sheet 30 where it drops through a discharge opening 36 in the housing 12.

The kernels that have passed through the openings in the stepped separating sheet 30 and through the perforations in the cage sheller 26 fall into a separating chamber formed in the bottom portion of the housing 12 and generally indicated by reference numeral 38. A reciprocating sheet 40 having perforations 41 separates the chamber 38 into an upper and lower portion. As is apparent to those skilled in the art, the sheet 40 may be reciprocated by conventional means. The upper portion opens to the discharge opening 36, previously referred to, and the lower portion connects with an air pressurizing assembly such as the centrifugal blower assembly 42 illustrated herein. The blower assembly 42 comprises a paddle wheel 44 rotated in a cylindrical chamber 46 by suitable drive mechanism for discharging air through a diffuser 48 which is connected to the lower portion of the chamber 38.

The pressurized air in the lower portion of chamber 38 passes upwardly through the perforations in the screen 40 and to the discharge opening 36. As the kernels of corn and relatively lightweight debris settle on, and are urged into motion by the screen 40, the lighter debris is blown away by the air flow up from the perforations and the heavier kernels of corn pass by the action of gravity down through the perforations. The kernels then collect at the bottom of the chamber 38 where they may be transmitted via an auger 50 and a lift conveyor 52 (both driven by a power unit) to an integrally mounted storage bin 54.

In accordance with the present invention, the sheller 10 incorporates a cage sheller assembly 26 which embodies the present invention, as illustrated in FIGS. 2 and 3. The corn sheller 26 comprises a lower perforated generally cylindrical sheet 56 which is mounted at its inlet end to a bulkhead or partition 58 mounted in the housing 12. The discharge end of the cage is suitably connected to a second bulkhead or partition 67 which is also mounted in the housing 12. A generally cylindrical top sheet 61 is connected to the perforated cage at a generally longitudinal flange 62 to form a cylindrical cage having perforations on the bottom side and having a generally unobstructed discharge end aligned with an opening 69 in the bulkhead 67. One end of the top sheet 61 is spaced from the inlet end of the cylinder 28 to form an inlet 68 for admission of the ears of corn. A pair of rasp bars 49, 51 are mounted to the inside of the perforated sheet 56 and a third rasp bar 53 is mounted to the top sheet 61.

The sheller cylinder 28 is journaled in the cage and comprises a drum 70 mounted on shafts 72, 74. The shaft 72 extends from the end of the cylinder 70 and is journaled by a bearing 71 in a bulkhead or partition 76 which is axially spaced from the bulkhead 67. The shaft 72 extends through bulkhead 67 to the drive sprocket 29. The shaft 74 is journaled in the bulkhead 58 by bearing 73. An auger is formed on the inlet end of the cylinder 70 by helical ribs 80. A series of generally rectangular teeth 82 extend radially from the cylinder 70 and are positioned between the inlet and discharge end of the cage 26. The teeth 82 are arranged in a helix pattern so that the rotation of the drum causes ears of corn to be rubbed against the perforated cage 56 and advanced towards the discharge end thereof. It should be particularly noted, with reference to plane A, that the cage and the rotating sheller cylinder 28 are tilted from the horizontal so that the discharge end of the cylinder is higher than the inlet end, thus causing the ears to travel up a plane to the discharge opening end in bulkhead 67.

Flanges or mounting plates 60 are spaced from the bulkhead 67 and secured to the sheet 61 and sheet 56. A pair of doors 86 and 88 are pivotally mounted at the bottom end of the opening 69 by a spacer 75 held between the flange 60 and bulkhead 67 by a bolt 77. The doors 86 and 88 have circular inner edges 87, 89, respectively, which are generally coincident with the opening 69. Each door 86 and 88 has a pair of slots 90 and 92 extending tangent to the pivotal mounting spacer 75. A plurality of spacers 94 are mounted between the flanges 60 and plate 67 by bolts 95. The spacers 94 extend through the slots 90 and 92 to provide a fixed spacing for the door operation and to provide stops which define the innermost pivoting of the doors 86 and 88. In this position (illustrated in phantom view) the doors define a generally elliptical opening which provides a restriction around the periphery of the opening 66.

The upper ends of the doors 86 and 88 have secured thereto nuts 96 and 98 which engage threaded portions 108, 110, respectively, of a shaft 100. The shaft 100 has an extension portion 106 extending through a side wall 103 of the housing 12. The shaft 100, 106 is journaled for rotation only relative to the pivotal mounting by a crank handle 102 positioned against the exterior of wall 103 and a sleeve 104 positioned against the interior of the wall 103. The thread patterns on the nuts and the threaded portions are arranged so that rotation of the shaft 100 by the crank handle 102 in a given direction causes the doors 86, 88 to pivot into overlapping relationship towards one another and rotation of the crank handle in an opposite direction causes them to pivot away from one another.

In operation, the unshelled ears of corn are fed into the inlet end of the cage 26 and are driven by the auger 80 towards the discharge end of the cylinder 70. The spikes or lugs 82 rub the ears of corn against the perforated cage, thereby causing the kernels to be separated from the ears of corn. The rasp bars 49, 51, 53 aid in the removal of corn by providing a rough surface on the inside walls of the cage 26. It should be noted that since the corn travels an upward path, the action of gravity provides a retarding force which maintains the ears of corn in contact with the action of the cage and cylinder a longer period of time without the necessity of providing a substantial restriction to the discharge end of the cylinder. By utilizing the action of gravity, a uniform shelling of the corn can be had even at flow rates which are far below the maximum rate of the corn sheller.

When it is necessary to further restrict the flow of corn through the sheller, the crank handle 102 is rotated to cause the doors 86 and 88 to pivot inwardly and provide an elliptical barrier which restricts the periphery of the discharge end of the cage 26. By providing the restriction around the periphery, optimum use is made of the barrier because the ears of corn tend to be concentrated around the outer walls of the cage due to centrifugal force. Thus, the corn sheller is able to maximize the pressure on the ears of corn without substantially reducing the discharge area of the sheller. The power required to rotate the drum is then substantially reduced and enables a significant increase in operating life of the drive assembly. The provision of the crank handle on the exterior of the sheller housing enables a greatly simplified and rapid change of the door opening to suit varying field conditions.

The provision of the stepped perforated reciprocating sheet 30 enables an even greater separating action to insure that all of the kernels of corn are recovered to maximize the yield.

While the above-described arrangement is herein shown in connection with a single sheller cylinder arrangement, it may be used with equal advantage in a high capacity double cylinder arrangement, the end view of which is shown in FIG. 4.

As shown particularly in FIG. 4, there is positioned in a modified sheller housing 12' a pair of sheller cylinder assemblies 26' in a side-by-side relationship. Each of the sheller cylinder arrangements 26' has a sheller cylinder 28' essentially similar to the sheller cylinder illustrated in FIGS. 2 and 3. A barrier or partition 120 extends between the side walls 121, 123 of the housing 12' and is spaced from the discharge ends of the cage assemblies 26'. The partition or bulkhead 120 has openings 122, 124, respectively, in line with the discharge ends of the side-by-side cage assemblies 26'. A pair of doors 126 and 128 are pivotally mounted on the partition 120 by a spacer 129 bolted to the lower end of the opening 122. A second pair of doors 130 and 132 are pivotally mounted on the partition 120 around the opening 124 by a spacer 134. Each pair of doors has circular inner edges generally coincident with the openings 122 and 124. The pairs of doors are pivoted into overlapping relationship over one another to form a variable generally elliptical opening which restricts the periphery of the openings 122 and 124. The ends of doors 126, 128 have nuts 136 and 138 which respectively engage threaded portions 140, 142 of a shaft 143. The ends of doors 130, 132 have nuts 144, 146 which respectively engage threaded portions 148, 150 of a shaft 152. The shafts 143 and 152 are connected by a coupling 154 and journaled for rotation only by a flange 156 and a crank handle 160 secured to the outer portion of the shaft 152 which extends through the side wall 123 of the housing 12'. The shafts 143 and 152 are threaded relative to the nuts 136, 138 and 144, 146, respectively, so that rotation of the crank handle 160 in a first direction causes each pair of doors to be pivoted towards one another to the relationship shown in phantom and rotation of the crank handle 160 in an opposite direction causes the pair of doors to be pivoted away from one another to the position shown in solid lines.

Each of the pairs of doors has a plurality of slots 162, 164 tangent to the spacers 129, 134. Spacers 166, 168 are bolted to the partition 120 and respectively extend through the slots 162, 164 to provide stops which limit the innermost pivoting of the doors to a maximum restriction position.

The double cylinder sheller arrangement operates in a manner similar to that of the single cylinder arrangement in that in both instances the sheller cylinders are tilted from the horizontal to utilize the action of gravity to retard the movement of the ears of corn to the discharge end. Additionally, however, the pairs of doors are pivoted in unison to restrict the discharge end of each cylinder to further increase the effectiveness of the shelling of corn. It is apparent that the double cylinder arrangement may be used with equal advantage in the sheller unit 10, illustrated in FIG. 1, to provide a substantially increased capacity.

The present invention is not limited to the preferred embodiment shown herein but is susceptible to modifications by those skilled in the art without departing from the spirit of the invention. Accordingly, the scope of the present invention is to be determined solely by the appended claims.

We claim:

1. A corn sheller for shelling corn, said sheller comprising:

at least one cylindrical perforated cage having an inlet and a relatively unobstructed discharge end;

a sheller cylinder rotatable in said cage for forming a generally annular shelling space therebetween;

a plurality of spikes extending radially from said cylinder into said annular space, said spikes being positioned in a helix pattern so that rotation of said cylinder causes ears of corn to be rubbed against said perforated cage against one another, whereby kernels of corn are separated from the cob of the ear and the kernels pass outwardly through the perforations in said cage while advancing from said inlet to said discharge end;

said sheller cylinder and said cage being tilted from the horizontal so that the discharge end is higher than the inlet end and the action of gravity retards the movement of said ears to said discharge end and increases the separation of kernels from the corn;

a pair of doors pivoted at one end and positioned adjacent the discharge end of said cage;

nut means mounted on each of said opposite ends of said doors;

rotatable screw shaft means journaled for rotation only relative to said pivot points and engaging said nut means;

the threads on said nut means and said screw shaft means being in a direction to displace the door ends towards one another for rotation of said screw shaft in one direction and away from one another for rotation in the opposite direction; and said doors having inner edges projecting into the annular space for forming a generally elliptical opening as a function of the displacement of the door ends relative to one another.

2. A corn sheller as in claim 1 wherein:

said sheller further comprises a plate normal to and adjacent the discharge end of said cage for defining a plane;

said doors are pivotally secured at one end thereof to said plate at a common point, whereby the doors variably overlap one another;

each of said doors having at least one generally arcuate slot having a center of curvature coincident with said pivot point; and said sheller further comprising a spacer secured to said plate and extending through said slot to provide a stop for the inward movement of said doors.

3. A corn sheller as in claim 1 in combination with:

an outer housing in which said sheller cylinder and said cage are mounted;

shaft means extending from said screw shaft means to the exterior of said housing; and a crank handle secured to the end of said shaft means for providing adjustment of said pivoted doors external to said outer housing.

4. Apparatus as in claim 3 wherein:

said housing further comprises a partition generally normal to the axis of said cage and said cylinder;

said sheller cylinder is journaled at its inlet end in said partition whereby the inlet end of said perforated cage abuts said partition;

said perforated cage has an opening formed in its upper side adjacent said partition for receiving ears of corn for shelling; and said apparatus further comprises an auger secured to the inlet end of said sheller cylinder and shaped to urge ears of corn towards the discharge end of said cage.

5. Apparatus as in claim 4 further comprising:

a partition axially spaced from the discharge end of said perforated cage;

a paddle wheel shaft extending from the discharge end of said sheller cylinder and journaled in said discharge end partition;

a plurality of paddles extending from said paddle wheel shaft whereby corn discharged from said cage is distributed by said paddle wheels;

a perforated stepped sheet positioned to receive the corn from said paddle wheel, said sheet being adapted to reciprocate for further separating kernels from said ear of corn; and a plurality of longitudinally extending rasp bars mounted on the inside of said perforated cage for providing a rough inner surface to increase the shelling effectiveness.

6. Apparatus as in claim 5 wherein the forward end of said perforated stepped sheet is positioned underneath said paddle wheel and the rearward end to which said ears of corn are urged by said steps is positioned away from the discharge end of said cage and wherein said apparatus further comprises:

an air separator comprising chamber means positioned underneath said cage and said perforated stepped sheet;

a perforated reciprocable screen dividing said chamber into an upper and lower space, said perforated screen having perforations approximately the size of a kernel of corn, the upper portion of said chamber having a discharge opening at its rearward end; and means for pressurizing the lower portion of said chamber whereby air flows upwardly through said perforations thereby causing kernels of corn to pass downwardly through said perforations for collection at the bottom of said chamber and waste material to be discharged from said opening.

7. A corn sheller as in claim 1 wherein:

said corn sheller comprises a pair of cylindrical perforated cages each having a sheller cylinder rotatable in said cage and each having a pair of said doors adjacent the discharge end of said cage; and said rotatable screw shaft means has threaded portions engaging the nut means for each pair of said doors and being threaded so that the ends of both pairs of doors are displaced in unison relative to one another.

8. A corn sheller as in claim 7 wherein:

said sheller further comprises a plate normal to and adjacent the discharge end of each cage for defining a plane;

said pairs of doors are pivotally secured at one end thereof to the plate at common points whereby the doors variably overlap one another;

each of said doors having at least one generally arcuate slot having a curvature coincident with said common pivot points; and said sheller further comprises a spacer secured to said plate and extending through said slots to provide stops for the inward movement of said doors.

9. A corn sheller as in claim 8 in combination with:

an outer housing in which said sheller cylinders and said cages are mounted;

shaft means extending from said screw shaft means to the exterior of said housing; and a crank handle secured to the end of said shaft means for providing adjustment of said pivoted doors external to said housing.

10. Apparatus as in claim 9 wherein:

said housing further comprises a partition generally normal to the axes of said cages and said cylinders;

said sheller cylinder is journaled at its inlet end in said partition whereby the inlet end of said perforated cage abuts said partition;

said perforated cage has an opening formed in its upper side adjacent said partition for receiving ears of corn for shelling; and said apparatus further comprises:

an auguer secured to the inlet end of each of said sheller cylinders and shaped to urge ears of corn towards the discharge end of each of said cages; and a plurality of longitudinally extending rasp bars mounted on the interior of said perforated cage.